(12) United States Patent  (10) Patent No.: US 10,691,769 B2
Tang  (45) Date of Patent: Jun. 23, 2020

(54) METHODS AND APPARATUS FOR REMOVING A DUPLICATED WEB PAGE

(71) Applicant: ALIBABA GROUP HOLDING LIMITED, George Town, Grand Cayman (KY)

(72) Inventor: Xiaopeng Tang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 638 days.

(21) Appl. No.: 15/582,322

(22) Filed: Apr. 28, 2017

(65) Prior Publication Data

US 2017/0235746 A1  Aug. 17, 2017

Related U.S. Application Data

(63) Continuation of application No. PCT/CN2015/092510, filed on Oct. 22, 2015.

(30) Foreign Application Priority Data

Oct. 30, 2014 (CN) .......................... 2014 1 0599140

(51) Int. Cl.
 *G06F 16/958* (2019.01)
 *G06F 16/951* (2019.01)
 (Continued)

(52) U.S. Cl.
 CPC ............ *G06F 16/958* (2019.01); *G06F 16/00* (2019.01); *G06F 16/2282* (2019.01);
 (Continued)

(58) Field of Classification Search
 CPC .. G06F 17/2247; G06F 17/248; G06F 3/0482; H04L 67/02
 See application file for complete search history.

(56) References Cited

U.S. PATENT DOCUMENTS 7,698,317 B2  4/2010  Sasturkar et al.
2006/0100956 A1  5/2006  Ryan et al.
(Continued)

FOREIGN PATENT DOCUMENTS

CN  101102316 A  1/2008
CN  101645082 A  2/2010
(Continued)

OTHER PUBLICATIONS

First Chinese Office Action issued in Chinese Application No. 201410599140.5, dated Jun. 2, 2018 (19 pages).
(Continued)

*Primary Examiner* — Etienne P Leroux
(74) *Attorney, Agent, or Firm* — Finnegan, Henderson, Farabow, Garrett & Dunner, LLP

(57) ABSTRACT

Methods and Apparatuses are disclosed for removing a duplicated web page. An exemplary method may include acquiring a plurality of web pages of a predetermined type extracting a feature code of a current web page and a number of text characters contained in the current web page for each web page. The method may also include looking up a data table to determine whether the feature code is contained in the data table. If the feature code is contained in the data table, the method may further include reading a number of text characters of the web page in the data table corresponding to the feature code, and discarding the current web page when a difference between the read number of text characters and the extracted number of the text characters is within a range.

18 Claims, 7 Drawing Sheets

(51) Int. Cl.
*G06F 16/22* (2019.01)
*G06F 16/23* (2019.01)
*G06F 16/00* (2019.01)
*H04L 29/08* (2006.01)

(52) U.S. Cl.
CPC ........ *G06F 16/2365* (2019.01); *G06F 16/951* (2019.01); *H04L 67/02* (2013.01)

(56) References Cited

U.S. PATENT DOCUMENTS

| | | |
|---|---|---|
| 2008/0162478 A1 | 7/2008 | Pugh et al. |
| 2010/0228718 A1 | 9/2010 | Chen |
| 2017/0031884 A1* | 2/2017 | Franczyk .............. G06F 40/154 |

FOREIGN PATENT DOCUMENTS

| | | |
|---|---|---|
| CN | 102799647 A | 11/2012 |
| CN | 103559259 A | 2/2014 |
| CN | 103646078 A | 3/2014 |
| KR | 2002-0009077 A | 2/2002 |
| KR | 2010-0115048 A | 10/2010 |
| KR | 2012-0124581 A | 11/2012 |
| WO | WO 02/10982 A2 | 2/2002 |
| WO | WO 2016/066043 A1 | 5/2016 |

OTHER PUBLICATIONS

First Chinese Search Report issued in Chinese Application No. 201410599140.5, dated May 24, 2018 (1 page).

Manku et al., "Detecting Near-Duplicates for Web Crawling," 16th International World Wide Web Conference, WWW2007—Banff, Alberta, Canada, pp. 141-150 (2007).

PCT International Search Report dated Dec. 28, 2015, issued in corresponding International Application No. PCT/CN2015/092510 (5 pages).

Supplementary European Search Report pursuant to Rule 62 EPC, the Supplementary European Search Report (Art. 153(7) EPC) and the European Search Opinion issued in EPO Application No. 15853793.6-1871 dated Jul. 17, 2018 (9 pages).

KIPO Notification of Reason for Refusal issued in Korean Application No. 10-2017-7014662, dated Feb. 18, 2020 by Korean Intellectual Property Office. (12 pages).

* cited by examiner

Everbright Pramerica Fund Management Co., Ltd.  Assets Management Granted

2008 Y 08 M 13 D 07:42   Source: NBD.com.cn *Daily Economic News*   Writing a comment   Comments (0)   Like (0)

It is reported that Everbright Pramerica Fund Management Co., Ltd. has been granted to develop business on asset management.

"We are delighted to inform you that China Securities Regulatory Commission has granted Everbright Pramerica to develop asset management business for specific clients after granting the 6$^{th}$ Everbright Pramerica Fund product, Everbright Pramerica Enhanced Yield Bond Stock Investment Fund," Everbright Pramerica President Dexiu Fu said.

It was said that Everbright Pramerica has selected a group of high quality, seasoned asset manager dedicated to assess management for specific clients, forming an asset management team of capability of developing business and creativity. Meanwhile, Every bright Pramerica has built relevant rules of asset management for specific clients, and will set up strict risk control to ensure the legitimacy of business development. Everbright Pramerica will remain committed to long-term investment of value investing, leverage techniques and experiences of domestic and foreign investors, and conscientiously manage assets for specific clients, helping those clients to achieve their financial goals.

〖 Author: Yu Chunning  Source: Daily Economic News 〗   ( Editor: Xin Haihong )

FIG. 2B

METHODS AND APPARATUS FOR REMOVING A DUPLICATED WEB PAGE

CROSS REFERENCE TO RELATED APPLICATION

This application claims priority to International Application No. PCT/CN2015/092510, filed on Oct. 22, 2015, which claims priority to and the benefits of priority to Chinese Application No. CN 201410599140.5, filed Oct. 30, 2014, both of which are incorporated herein by reference in their entireties.

TECHNICAL FIELD

The present application relates to Internet technologies, and more particularly, to methods and apparatuses for removing a duplicated web page.

BACKGROUND

With the development of Internet technologies, the Internet has become an important source for people to acquire various information. However, much information on the Internet is duplicated. Among billions or tens of billions of web pages, there are a large amount of web pages with duplicated information, which makes information processing difficult. Therefore, it is very important to remove duplicated web pages.

A current method may include removing duplicated web pages by selecting feature codes in web pages and comparing the feature codes. The existing method for removing duplicated web pages by means of feature codes of the web pages may include firstly selecting a period, a mark showing the end of a sentence, in a first web page as a locating point, and selecting a certain number of characters (e.g., Chinese characters or English characters) at two sides of the locating point as a feature code. The method may also include acquiring another feature code in a second web page by the same steps. The method may further include comparing the feature codes of the two web pages. If the feature codes of the two web pages are the same, the method may include determining that the second web page is a duplicated web page, and discarding the duplicated second web page. If the two feature codes are different, the method may include determining that the two web pages are different. In other words, the second web page is not a duplicated one from the first web page.

A potential problem of the existing method for removing duplicated web pages based on the feature codes is that it may make a wrong decision for two web pages with the same feature code but different contents. For example, a first web page may include a poem with several dozen characters. A user may incorporate certain content of the first web page into a second web page, and explain the poem in hundreds of characters according to his understanding. The explanation may not include any period. If the method for removing a duplicated web page is merely based on feature codes, these two web pages may be determined to be the same web page. However, the two web pages are different web pages. Therefore, accuracy of the above method for removing duplicated web pages may not be high. In addition, the feature codes extracted in the above method may be inaccurate. For example, the user may add a period in a caption or an edit for the included web page. When the feature codes are extracted according to the existing method, the feature codes of the original web page and the web page incorporating forwarded text are different. As a result, the original web page and the web page incorporating forwarded text may be determined to be different web pages. However, the texts of the original web page and the web page incorporating forwarded text may be the same.

SUMMARY

The present application is directed to solve at least one of the technical problems in the related art to some extent.

The present application is aimed to propose a method for removing a duplicated web page, which may greatly improve accuracy and reduce wrong decision rate of removing duplicated web pages.

The present application is also aimed to propose an apparatus for removing a duplicated web page.

In one aspect, the present disclosure is directed to a method for removing a duplicated web page. The method may include acquiring a plurality of web pages of a predetermined type. The method may also include extracting a feature code of a current web page and a number of text characters contained in the current web page for each web page. The method may further include looking up a pre-set data table to determine whether the feature code is contained therein. If the feature code is contained therein, the method may include reading a number of text characters of the web page in the data table corresponding to the feature code, and discarding the current web page when a difference between the read number of text characters and the extracted number of the text characters is within a pre-set range.

One of method embodiments of the present application may include acquiring a plurality of web pages of a predetermined type, extracting a feature code of a current web page and a number of text characters contained in the current web page for each web page, and looking up a pre-set data table to determine whether the feature code is contained therein. If the feature code is contained therein, the method also include reading a number of text characters of the web page in the data table corresponding to the feature code, and discarding the current web page when a difference between the read number of text characters and the extracted number of the text characters is within a pre-set range. The method embodiment may remove duplicated web pages in accordance with the feature codes of web pages and the number of text characters contained in the web pages. It may greatly improve the accuracy and reduce the wrong decision rate of removing duplicated web pages compared to the existing method that removes duplicated web pages merely based on feature codes.

In another aspect, the present disclosure is directed to an apparatus for removing a duplicated web page. The apparatus may include an acquisition module configured to acquire a plurality of web pages of a predetermined type. The apparatus may also include a first processing module configured to extract a feature code of a current web page and a number of text characters contained in the current web page for each web page, and look up a pre-set data table to determine whether the feature code is contained therein. If the feature code is contained therein, the first processing module may be configured to read a number of text characters of the web page in the data table corresponding to the feature code, and discard the current web page when a difference between the read number of text characters and the extracted number of the text characters is within a pre-set range.

One of apparatus embodiments of the present application may include an acquisition module configured to acquire a plurality of web pages of a predetermined type. The apparatus may also include a first processing module configured to extract a feature code of a current web page and a number of text characters contained in the current web page for each web page, and look up a pre-set data table to determine whether the feature code is contained therein. If the feature code is contained therein, the first processing module may be configured to read a number of text characters of the web page in the data table corresponding to the feature code, and discard the current web page when a difference between the read number of text characters and the extracted number of the text characters is within a pre-set range. The apparatus embodiment may remove duplicated web pages in accordance with the feature codes of web pages and the number of text characters contained in the web pages. It may greatly improve the accuracy and reduce the wrong decision rate of removing duplicated web pages compared to the existing method that removes duplicated web pages merely based on feature codes.

BRIEF DESCRIPTION OF THE DRAWINGS

FIG. 2B is a schematic diagram of an exemplary English web page translated from FIG. 2A, according to an embodiment of the present application.

DETAILED DESCRIPTION

The embodiments of the present application will be described in detail in the following. The examples of these embodiments are illustrated in the figures. The same or similar elements designated by the same or similar reference numbers may have the same or similar functions. These embodiments described with reference to the figures are merely exemplary, which are intended to explain the present application. They shall not be construed as any limitation to the present application.

The method and apparatus embodiments for removing a duplicated web page are described with reference to the figures as follows.

Figure 1:
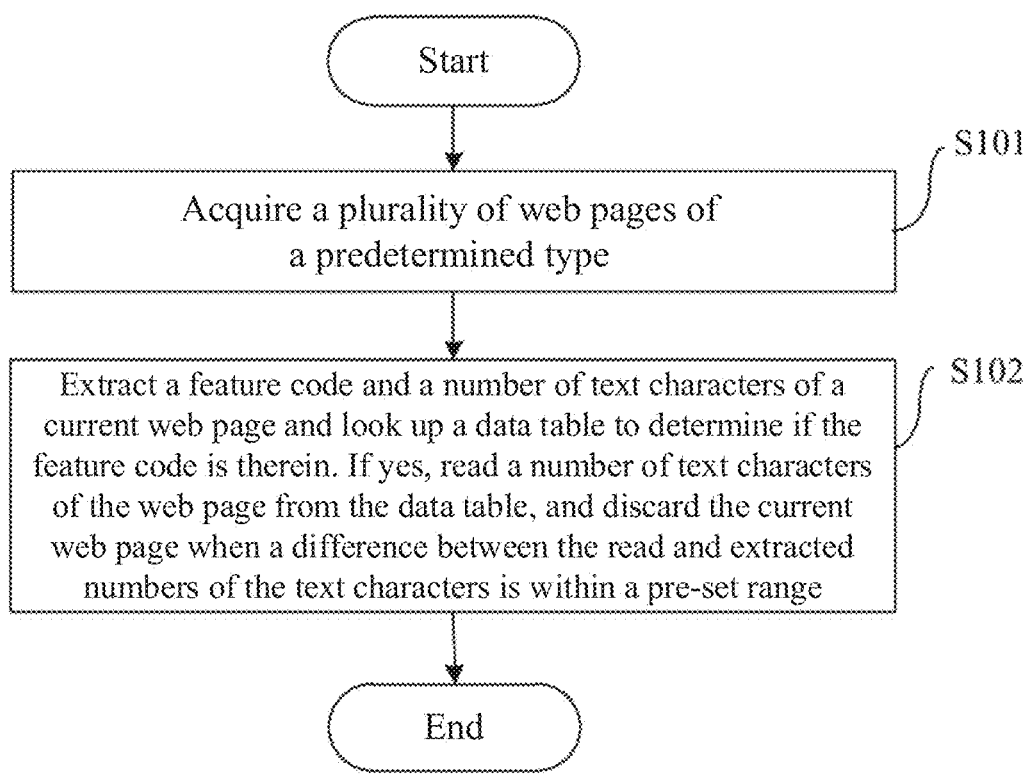
FIG. 1 is a flow chart of an exemplary method for removing a duplicated web page, according to an embodiment of the present application.

FIG. 1 is a flow chart of an exemplary method for removing a duplicated web page, according to an embodiment of the present application. As shown in FIG. 1, the method for removing a duplicated web page may include the following steps.

S101: Acquire a plurality of web pages of a predetermined type.

After searching a certain keyword by a search engine, a user may acquire a plurality of web pages relevant to the keyword, and select a predetermined type of web pages therefrom, such as web pages containing texts.

S102: Extract a feature code of a current web page and a number of text characters contained in the current web page for each web page, and look up a pre-set data table to determine whether the feature code is contained therein. If the feature code is contained therein, the step further include reading a number of text characters of the web page in the data table corresponding to the feature code, and discarding the current web page when a difference between the read number of text characters and the extracted number of the text characters is within a pre-set range.

After acquiring the plurality of web pages of a predetermined type, such as web pages containing texts, the method may include acquiring paragraphs contained in the text of the current web page for each acquired web page. The method may also include selecting a first pre-set number of text characters at a pre-set location of a current paragraph for each paragraph, and generating the feature code by a calculation on a character string that combines all the selected text characters of the paragraphs.

In some embodiments, the method may include selecting a second pre-set number of text characters on the left and right sides of a central location of the current paragraph. The second pre-set number may be half of the first pre-set number, and the second pre-set number may be 3 to 8. In some embodiments, the second pre-set number may be set to be 5 in order to improve the capability of removing duplicated web pages and reduce the storage space of the feature codes. The first pre-set number may be set to be 10 accordingly.

For example, a web page may include only one paragraph and the paragraph may contain 1000 characters (e.g., Chinese characters or English characters). The above method may include respectively selecting 5 characters on the left and right sides of the central location of the paragraph. The method may include selecting a total of 10 characters accordingly. These 10 characters may be equivalent to a 10-order text (10-gram) in accordance with a definition of an n-gram grammar in information theory. A duplicated probability of these 10 Chinese characters may be about $1/(6753)^{10}$ while considering there are total 6753 Chinese characters. In other words, the duplicated probability of the feature code of this web page may be about $1/(6753)^{10}$. Accordingly, the method selecting 10 characters at the central location of each paragraph may effectively ensure that the feature codes of the web pages are different, and improve the accuracy of the feature codes of the web pages.

In some embodiments, if the number of characters in a certain paragraph in the web page is smaller than the first pre-set number, the method may include supplementing the feature code with certain specific characters.

In some embodiments, after selecting the first pre-set number, e.g., 10, of characters from each paragraph of the current web page, the method may also include combining the selected characters into a character string in accordance to the sequence of these paragraphs. For the purpose of rapidly and efficiently looking up the character string to determine whether web pages contain duplicated contents, the method may further include generating a feature code by a calculation on the character string for each web page. In some embodiments, the method may include calculating and converting the character string, corresponding to each web page, into a hash value by a hash function. The hash value of each web page is used as the feature code of the web page.

For example, in a JAVA program, the codes of a hash function for converting a character string into a corresponding hash value are as follows:

```
public int hashCode( ) {
int h = hash;
if(h == 0) {
int off = offset;
char val[ ] = value;
int len = count; for(int i = 0; i < len; i++) {
h = 31 * h + val[off++];
}
hash = h;
}
return h;
}
```

In the above example, the hash function includes multiplying the higher bits of the character string by 31 and adding the lower bits. The value range of an int type in JAVA is from −2147483648 to 2147483647, which covers a range of up to 4 billion. Therefore, it is pretty unlikely that different character strings may be converted into the same hash value. In other words, the possibility that different web pages have the same feature code is extremely low. Accordingly, the accuracy of the extracted feature code of the web page is high.

The method may include taking the text structure of a web page into consideration while acquiring the feature code of the web page. For example, the method may include selecting the first pre-set number of text characters at the pre-set location of the current paragraph for each paragraph in the text of the web page. The method may also include combining the selected text characteristics of all paragraphs into a character string, and generating the feature code in accordance with the character string. Compared to the existing method of feature code extraction which takes a period as a locating point, the accuracy of the feature code obtained in this method is high. Different websites may add different caption and/or edit information while including forwarded information. Different websites may also delete, modify, page, or add information in various manners. Therefore, to improve the accuracy of feature codes for web pages of the same type, the method may also include extracting the number of characters contained in the text of each web page while extracting the feature code of each web page.

After extracting the feature code and the number of characters contained in the text of the current web page, the method may include looking up a pre-set data table, e.g., a hash table, to determine whether the feature code is contained therein. In other words, the method may include looking up whether the hash value is contained in the hash table. If the hash value is contained in the hash table, the method may include reading the number of text characters of the web page in the hash table corresponding to the hash value, and comparing with the number of text characters of the current web page. If the difference between the two numbers is within a pre-set range, such as 0 to 50, the method may include deeming the current web page as a duplicated web page, and discarding it.

In some embodiments, the hash table may be a good data structure for organizing feature codes, in which a record may be looked up by mapping a key code value, or the feature code of a web page, into a location of the table. It may accelerate the speed of the looking up. The hash table may have an efficient retrieval capacity, and may support dynamic data storage and access.

Figure 2A:
FIG. 2A is a schematic diagram of an exemplary web page in Chinese, according to an embodiment of the present application.
Figure 3A:
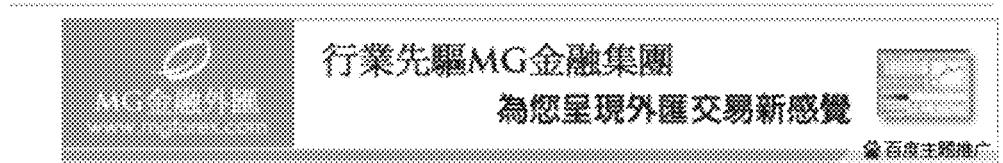
FIG. 3A is a schematic diagram of another exemplary web page in Chinese, according to an embodiment of the present application.
Figure 3B:
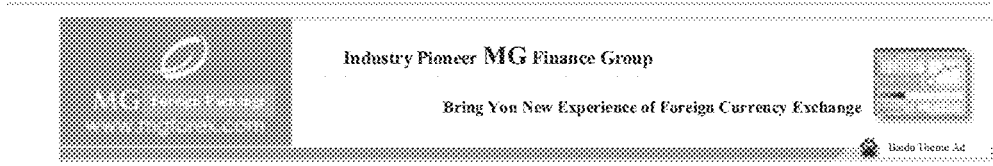
FIG. 3B is a schematic diagram of an exemplary English web page translated from FIG. 3A, according to an embodiment of the present application.

For example, the pre-set range may be set to be 0 to 50. The hash table is assumed as having stored a hash value corresponding to the web page as shown in FIG. 2A or 2B and a number of text characters contained in the web page. After extracting the feature code of the web page as shown in FIG. 3A or 3B and the number of text characters contained in the web page, the method may include looking up the hash table and determining that the feature code of the web page shown in FIG. 3A or 3B is the same as that of the web page shown in FIG. 2A or 2B. In this case, the method may include reading the number of text characters of the web page corresponding to the hash in the hash table. That is the number of text characters contained in the web page as shown in FIG. 2A or 2B. The method may further include calculating the difference between the number of text characters of the web page shown in FIG. 3A or 3B and the number of text characters of the web page shown in FIG. 2A or 2B and obtaining that the difference is 18. The difference between the two numbers of text characters of the two web pages is within the pre-set range. Therefore, the method may include deeming that the web pages shown in FIGS. 3A and 2A or the web pages shown in FIGS. 3B and 2B are the same web page, and discarding the web page shown in FIG. 3A or 3B.

In some embodiments, the method may include writing the correspondence between the extracted feature code and the extracted number of text characters of the current web page into the data table if the feature code is not contained in the data table.

In some embodiments, the method may include writing the correspondence between the extracted feature code and the extracted number of text characters of the current web page into the data table when the difference between the read number of text characters and the extracted number of the text characters is not within the pre-set range.

Compared to the existing method for removing duplicated web pages that is merely based on feature codes, the method of the present application may include comparing the difference between the numbers of text characters of the two web pages as well as comparing the feature codes of the two web pages. Accordingly, it may effectively reduce the wrong decision rate for web pages with the same feature code but different numbers of text characters. Moreover, the method of the present application may adopt a scheme of feature code extraction different from that in the prior art. It may effectively reduce the wrong decision rate for web pages with the same feature code but slightly different numbers of text characters. Accordingly, the accuracy of removing duplicated web pages is improved.

For example, the pre-set range may be set be 0 to 50. The number of text characters of the current web page may be 4900. The feature code corresponding to the current web page may exist in the hash table, and the number of text characters of the web page corresponding to the feature code may be 5000 in the hash table. In this case, the method may include obtaining an absolute value of the number difference of text characters between the current web page and the web page in the hash table as being 100. Such an absolute value of the number difference is not within the pre-set range. Therefore, the method may include deeming that the current web page is not a duplicated web page. In some embodiments, the method may include writing the correspondence between the extracted feature code and the extracted number of text characters of the current web page into the hash table.

As another example, a search engine may obtain 10 web pages relevant to the keyword. Three of them are web pages with the same contents. The method may include extracting the feature codes of these 10 web pages and the numbers of text characters contained in the 10 web pages respectively. The method may also include removing duplicate web pages among these 10 web pages in accordance with a hash table. The method may include establishing the hash table in the course of removing duplicated web pages. When the hash table is established, the corresponding removing duplicated web pages is ended. The same web pages among these 10 web pages will be removed. The method may include establishing a retrieval system in accordance with the feature codes, and looking up the web page and removing duplicated web pages in accordance with the retrieval system. On the basis of removing duplicated web pages in such a way, it may improve the efficiency of removing duplicated web pages.

There may have 50 thousand web pages obtained in an example. The above method may include removing duplicated web pages for these 50 thousand web pages. One approach to evaluating the accuracy of removing duplicated web pages by the method may include random sampling manually. For example, 6 people may randomly select 50 duplicated web pages for such evaluation. The results of removing duplicated web pages are shown in Table 1.

TABLE 1

Results of removing duplicated web pages.

| User | 1 | 2 | 3 | 4 | 5 | 6 |
|---|---|---|---|---|---|---|
| Number of web pages | 50 | 50 | 50 | 50 | 50 | 50 |
| Number of errors | 2 | 1 | 4 | 1 | 1 | 1 |

The number of errors in Table 1 may represent the number of the same web pages that may not be removed by the above method. By some calculations, the accuracy of removing duplicated web pages in Table 1 is 96.7%.

In case the existing method that is merely based on the feature codes is applied to remove duplicated web pages for the same 50 web pages, the results of removing duplicated web pages are shown in Table 2.

TABLE 2

Results of removing duplicated web pages.

| User | 1 | 2 | 3 | 4 | 5 | 6 |
|---|---|---|---|---|---|---|
| Number of web pages | 50 | 50 | 50 | 50 | 50 | 50 |
| Number of errors | 4 | 2 | 6 | 2 | 3 | 2 |

By some calculations, the accuracy of removing duplicated web pages in Table 2 is 90.37%. By comparing the accuracy values of Tables 1 and 2, the accuracy of removing duplicated web pages of the above method is higher than that of the existing method that is merely based on the feature codes.

The method of the present application may include acquiring a plurality of web pages of a predetermined type, extracting a feature code of a current web page and a number of text characters contained in the current web page for each web page, and looking up a pre-set data table to determine whether the feature code is contained therein. If the feature code is contained therein, the method also include reading a number of text characters of the web page in the data table corresponding to the feature code, and discarding the current web page when a difference between the read number of text characters and the extracted number of the text characters is within a pre-set range. The method embodiment may remove duplicated web pages in accordance with the feature codes of web pages and the number of text characters contained in the web pages. It may greatly improve the accuracy and reduce the wrong decision rate of removing duplicated web pages compared to the existing method that removes duplicated web pages merely based on feature codes.

The present application also proposes an apparatus for removing a duplicated web page to implement the above embodiments.

Figure 4:
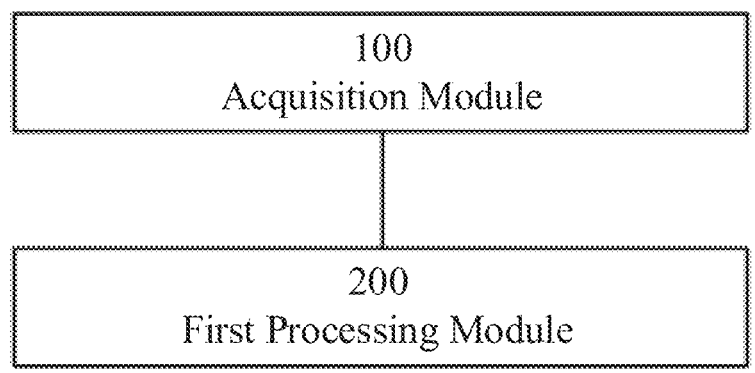
FIG. 4 is a structural schematic diagram of an exemplary apparatus for removing a duplicated web page, according to an embodiment of the present application.

FIG. 4 is a structural schematic diagram of an exemplary apparatus for removing a duplicated web page, according to an embodiment of the present application. As shown in FIG. 4, the apparatus may include an acquisition module 100 and a first processing module 200.

Acquisition module 100 may be configured to acquire a plurality of web pages of a predetermined type. First processing module 200 may be configured to extract a feature code of a current web page and a number of text characters contained in the current web page for each web page. First processing module 200 may also be configured to look up a pre-set data table to determine whether the feature code is contained therein. If the feature code is contained therein, first processing module 200 may be further configured to read a number of text characters of the web page in the data table corresponding to the feature code, and discard the current web page when a difference between the read number of text characters and the extracted number of the text characters is within a pre-set range.

In some embodiments, there may have a plurality of types of web pages. Acquisition module 100 may be configured to acquire the web pages of a predetermined type from the plurality of web pages, such as the web pages containing texts.

In some embodiments, first processing module 200 may be configured to acquire paragraphs contained in the text of the current web page. First processing module 200 may also be configured to select a first pre-set number of text characters at a pre-set location of a current paragraph for each paragraph. First processing module 200 may be further configured to generate the feature code by a calculation on a character string that combines all the selected text characters of the paragraphs.

In some embodiments, first processing module 200 may be configured to convert the character string corresponding to each web page into a hash value by a hash function, and use the hash value as the feature code of the web page.

In some embodiments, first processing module 200 may be configured to select a second pre-set number of text characters on the left and right sides of a central location of the current paragraph. The second pre-set number may be half of the first pre-set number, and the second pre-set number may be set to be 3 to 8. To improve the capability of removing duplicated web pages and reduce the storage space of the feature codes, first processing module 200 may be configured to set the second pre-set number to be 5. The first pre-set number may be set to be 10 accordingly.

In some embodiments, if the number of characters in a certain paragraph in the web page is smaller than the first pre-set number, first processing module 200 may be configured to supplement the feature code with certain specific characters.

In some embodiments, the above data table may be a hash table. The hash table may be a good data structure for organizing feature codes, in which a record may be looked up by mapping a key code value, or the feature code of a web page, into a location of the table. It may accelerate the speed of the looking up. The hash table may have an efficient retrieval capacity, and may support dynamic data storage and access.

Figure 5:
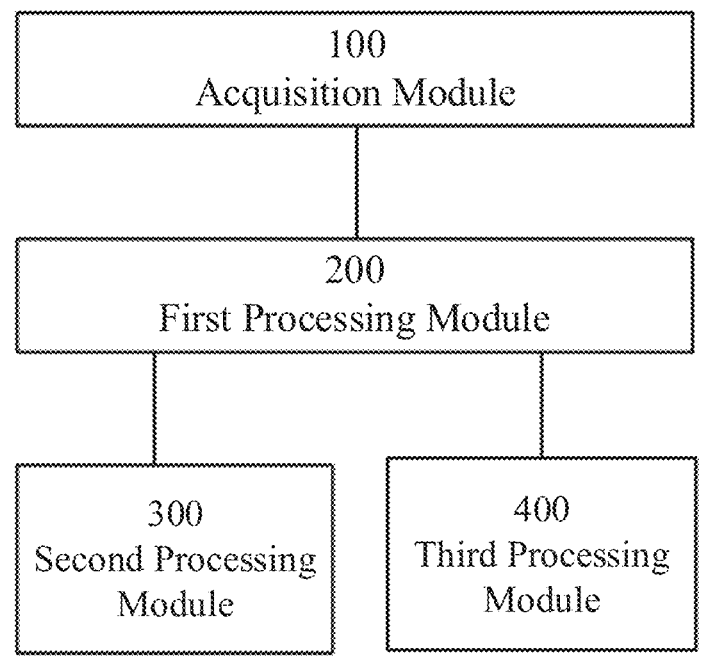
FIG. 5 is a structural schematic diagram of another exemplary apparatus for removing a duplicated web page, according to an embodiment of the present application.

As shown in FIG. 5, the apparatus may further include a second processing module 300. Second processing module 300 may be configured to write the correspondence between the extracted feature code and the extracted number of text characters of the current web page into the data table if the feature code is not contained in the data table after first processing module 200 looks up the pre-set data table to determine whether the feature code is contained therein.

In some embodiments, the apparatus may further include a third processing module 400. Third processing module 400 may be configured to write the correspondence between the extracted feature code and the extracted number of text characters of the current web page into the data table when the difference between the read number of text characters and the extracted number of the text characters is not within the pre-set range.

In some embodiments, the difference between the read number of text characters from a pre-set data table, e.g., a hash table, and the extracted number of text characters of the current web page may be smaller than the pre-set range. For example, the pre-set range may be set as 0 to 50, and the difference between the two web pages is 120. Third processing module 400 may be configured to write the correspondence between the extracted feature code and the extracted number of text characters of the current web page into the data table.

The apparatus for removing a duplicated web page may include an acquisition module configured to acquire a plurality of web pages of a predetermined type. The apparatus may also include a first processing module configured to extract a feature code of a current web page and a number of text characters contained in the current web page for each web page, and look up a pre-set data table to determine whether the feature code is contained therein. If the feature code is contained therein, the first processing module may be configured to read a number of text characters of the web page in the data table corresponding to the feature code, and discard the current web page when a difference between the read number of text characters and the extracted number of the text characters is within a pre-set range. The apparatus embodiment may remove duplicated web pages in accordance with the feature codes of web pages and the number of text characters contained in the web pages. It may greatly improve the accuracy and reduce the wrong decision rate of removing duplicated web pages compared to the existing method that removes duplicated web pages merely based on feature codes.

In the present application, reference terms "an embodiment," "some embodiments," "an example," "a particular example," "some examples," and so on mean that a particular feature, structure, material or property described in the embodiment(s) or example(s) is contained in at least one embodiment or example of the present application. The illustrative expression of the above terms is not necessarily applied to the same embodiment or example. In addition, the described particular feature, structure, material or property may be combined in a suitable manner in any one or more embodiments or examples. Moreover, as long as there is no contradiction, those people skilled in the art may combine different embodiments or examples with the features of different embodiments or examples in the present application.

In addition, the terms "first" and "second" are merely used for the descriptive purpose and shall not be construed as indicating or implying relative importance or implicitly indicating the number of the indicated technical features. Therefore, a feature defined by the terms "first" and "second" may explicitly or implicitly indicate that at least one of the feature is included. In the present application, the meaning of "a plurality of" is at least two, such as two, three and so on, unless otherwise specifically defined.

Any process or method described in the flowcharts or other manners shall be understood as representing a code module, segment or portion including one or more executable instructions for implementing specific logic functions or process steps, and the scope of the preferred embodiments of the present application may include other implementations. The functions may be executed not in the illustrated or discussed sequence, including in a substantially simultaneous order or an inverse order. It shall be understood by those people skilled in the art.

The logic and/or steps described in the flowcharts or in other manners, e.g., a sequential list of executable instructions for implementing logic functions, may be implemented in any computer-readable medium for usage of instruction execution systems, apparatuses or devices, such as computer-based systems, systems including processors, or other systems which can read instructions from an instruction execution system, apparatus or device and execute them, or in combination therewith to use. In the present application, "computer-readable medium" may be any apparatus that contains, stores, communicates, propagates or transmits programs for an instruction execution system, apparatus or device or in combination therewith for the usage. More particular examples of the computer-readable medium may include but not limited to the following: an electrical connector (an electronic apparatus) having one or more connecting wires, a portable computer disk drive (a magnetic apparatus), a random access memory (RAM), a read-only memory (ROM), an erasable programmable read-only memory (EPROM or flash memory), a fiber optic apparatus, and a portable compact disc read-only memory (CDROM).

Each element described in the present application may be implemented with hardware, software, firmware or a combination thereof. In the above implementation, a plurality of steps or methods may be implemented in software or firmware which is stored in the memory and executed by a suitable instruction execution system. For example, the hardware implementation is the same as that in another embodiment, which can be implemented with any one of the following technologies well-known in the art or a combination thereof: a discrete logic circuit having a logic gate circuit which implements a logic function for a data signal, a dedicated integrated circuit having a suitable combined logic gate circuit, a programmable gate array (PGA), a field programmable gate array (FPGA) and so on.

Those people skilled in the art may understand that all or some steps for implementing the above embodiment methods may be completed by instructing relevant hardware through a program which may be stored in a computer-readable storage medium. When being executed, the implementation may include one of the steps or a combination of multiple steps of the method embodiment.

In addition, all functional units of each embodiment of the present application may be integrated in one processing module, or each unit may separately exist physically. It is also possible that two or more units may also be integrated in one module. The above integrated modules may be implemented with hardware, or software functional modules. The integrated modules may also be stored in a computer-readable storage medium when being implemented with software functional modules and sold or used as separate products.

The above-mentioned storage medium may be a read-only memory, a magnetic disk, an optical disk, and so on. While the embodiments of the present application have been illustrated and described hereinabove, it shall be understood that the above embodiments are illustrative and shall not be construed as a limitation to the present application. Those people skilled in the art may change, modify, replace or vary the above embodiments within the scope of the present application.

What is claimed is:

1. A method for removing a duplicated web page, the method comprising:
   acquiring a plurality of web pages of a predetermined type;
   extracting a feature code of a current web page and a number of text characters contained in the current web page;
   looking up a data table to determine whether the feature code is contained in the data table; and
   in response to the feature code being contained in the data table:
      reading a number of text characters of the web page referred to in the data table corresponding to the feature code, and
      discarding the current web page when a difference between the read number of text characters and the extracted number of text characters is within a range.

2. The method according to claim 1, further comprising:
   writing correspondence between the extracted feature code and the extracted number of text characters of the current web page into the data table in response to the feature code not being contained in the data table after looking up the data table to determine whether the feature code is contained in the data table.

3. The method according to claim 1, further comprising:
   writing the correspondence between the extracted feature code and the extracted number of text characters of the current web page into the data table when the difference between the read number of text characters and the extracted number of text characters is not within the range.

4. The method according to claim 1, wherein extracting the feature code of the current web page comprises:
   acquiring paragraphs contained in the text of the current web page;
   selecting a first number of text characters at a location of a current paragraph for each paragraph; and
   generating the feature code by a calculation on a character string that combines all the selected text characters of the paragraphs.

5. The method according to claim 4, wherein selecting the first number of text characters at the location of the current paragraph comprises:
   selecting a second number of text characters on the left and right sides of a central location of the current paragraph,
   wherein the second number is half of the first number, and the second number is 3 to 8.

6. The method according to claim 5, wherein the second number is 5.

7. An apparatus for removing a duplicated web page, the apparatus comprising:
   an acquisition module configured to acquire a plurality of web pages of a predetermined type; and
   a first processing module configured to:
      extract a feature code of a current web page and a number of text characters contained in the current web page for each web page,
      look up a data table to determine whether the feature code is contained in the data table, and
      in response to the feature code being contained in the data table, read a number of text characters of the web page referred to in the data table corresponding to the feature code, and discard the current web page when a difference between the read number of text characters and the extracted number of text characters is within a range.

8. The apparatus according to claim 7, further comprising:
   a second processing module configured to write the correspondence between the extracted feature code and the extracted number of text characters of the current web page into the data table in response to the feature code is not being contained in the data table after looking up the data table to determine whether the feature code is contained in the data table.

9. The apparatus according to claim 7, further comprising:
   a third processing module configured to write the correspondence between the extracted feature code and the extracted number of text characters of the current web page into the data table when the difference between the read number of text characters and the extracted number of text characters is not within the range.

10. The apparatus according to claim 7, wherein the first processing module is configured to:
    acquire paragraphs contained in the text of the current web page;
    select a first number of text characters at a location of a current paragraph for each paragraph; and
    generate the feature code by a calculation on a character string that combines all the selected text characters of the paragraphs.

11. The apparatus according to claim 10, wherein the first processing module is configured to select a second number of text characters on the left and right sides of a central location of the current paragraph, wherein the second number is half of the first number, and the second number is 3 to 8.

12. The apparatus according to claim 11, wherein the second number is 5.

13. A non-transitory computer readable medium that stores a set of instructions that is executable by at least one processor of an apparatus to cause the apparatus to perform a method for removing a duplicated web page, the method comprising:
    acquiring a plurality of web pages of a predetermined type;
    extracting a feature code of a current web page and a number of text characters contained in the current web page;
    looking up a data table to determine whether the feature code is contained in the data table; and
    in response to the feature code being contained in the data table:
       reading a number of text characters of the web page referred to in the data table corresponding to the feature code, and
       discarding the current web page when a difference between the read number of text characters and the extracted number of text characters is within a range.

14. The non-transitory computer-readable medium of claim 13, wherein the method further comprises:

writing correspondence between the extracted feature code and the extracted number of text characters of the current web page into the data table in response to the feature code not being contained in the data table after looking up the data table to determine whether the feature code is contained in the data table.

15. The non-transitory computer-readable medium of claim 13, wherein the method further comprises:

writing the correspondence between the extracted feature code and the extracted number of text characters of the current web page into the data table when the difference between the read number of text characters and the extracted number of text characters is not within the range.

16. The non-transitory computer-readable medium of claim 13, wherein extracting the feature code of the current web page comprises:

acquiring paragraphs contained in the text of the current web page;

selecting a first number of text characters at a location of a current paragraph for each paragraph; and generating the feature code by a calculation on a character string that combines all the selected text characters of the paragraphs.

17. The non-transitory computer-readable medium of claim 16, wherein selecting the first number of text characters at the location of the current paragraph comprises:

selecting a second number of text characters on the left and right sides of a central location of the current paragraph, wherein the second number is half of the first number, and the second number is 3 to 8.

18. The non-transitory computer-readable medium of claim 17, wherein the second number is 5.

* * * * *